(12) United States Patent
Beller et al.

(10) Patent No.: US 10,372,714 B2
(45) Date of Patent: Aug. 6, 2019

(54) AUTOMATED DETERMINATION OF DOCUMENT UTILITY FOR A DOCUMENT CORPUS

(71) Applicant: International Business Machines Corporation, Armonk, NY (US)

(72) Inventors: Charles Evan Beller, Baltimore, MD (US); William G Dubyak, Severna Park, MD (US); Palani Sakthi, Palatine, IL (US); Kristen Maria Summers, Takoma Park, MD (US)

(73) Assignee: International Business Machines Corporation, Armonk, NY (US)

( * ) Notice: Subject to any disclaimer, the term of this patent is extended or adjusted under 35 U.S.C. 154(b) by 632 days.

(21) Appl. No.: 15/017,089

(22) Filed: Feb. 5, 2016

(65) Prior Publication Data
US 2017/0228434 A1   Aug. 10, 2017

(51) Int. Cl.
| | |
|---|---|
| G06F 16/33 | (2019.01) |
| G06F 16/93 | (2019.01) |
| G06F 16/332 | (2019.01) |
| G06F 16/9535 | (2019.01) |
| G06F 16/2457 | (2019.01) |
| G06F 17/27 | (2006.01) |
| G06F 16/248 | (2019.01) |

(52) U.S. Cl.
CPC ...... *G06F 16/24575* (2019.01); *G06F 16/248* (2019.01); *G06F 16/332* (2019.01); *G06F 16/3334* (2019.01); *G06F 16/93* (2019.01); *G06F 16/9535* (2019.01); *G06F 17/2765* (2013.01)

(58) Field of Classification Search
USPC .............................................. 707/739; 704/7
See application file for complete search history.

(56) References Cited

U.S. PATENT DOCUMENTS

| | | | |
|---|---|---|---|
| 5,974,412 A | 10/1999 | Hazlehurst et al. | |
| 6,847,966 B1* | 1/2005 | Sommer | G06F 16/3347 707/739 |
| 7,865,354 B2* | 1/2011 | Chitrapura | G06F 17/2785 704/4 |
| 8,036,876 B2* | 10/2011 | Sanfilippo | G06F 16/367 704/9 |

(Continued)

OTHER PUBLICATIONS

Schlaefer, et al., "Statistical Source Expansion for Question Answering", CIKM '11 Proceedings of the 20th ACM International Conference on Information and Knowledge Management, pp. 345-354, 2011, 171 pages.

*Primary Examiner* — Cheyne D Ly
(74) *Attorney, Agent, or Firm* — DeLizio Law, PLLC

(57) ABSTRACT

A candidate document is received, for example, by a document filter. A determination is made based on the content of the candidate document, whether the candidate document is relevant to a document corpus. A determination is made based on the content of the candidate document, whether the candidate document is novel with respect to the document corpus. In response to determining that the candidate document is relevant to the document corpus and novel with respect to the document corpus, the candidate document is added to the document corpus to make at least a portion of the content of the candidate document available for a response to a search query.

14 Claims, 4 Drawing Sheets

(56) References Cited

U.S. PATENT DOCUMENTS

| | | | |
|---|---|---|---|
| 8,626,486 B2* | 1/2014 | Och | G06F 17/28 |
| | | | 704/2 |
| 8,630,847 B2* | 1/2014 | Tang | G06F 17/277 |
| | | | 704/1 |
| 8,892,550 B2* | 11/2014 | Chu-Carroll | G06F 17/30637 |
| | | | 707/728 |
| 2003/0069873 A1* | 4/2003 | Fox | G06F 17/30696 |
| 2005/0149494 A1* | 7/2005 | Lindh | G06F 17/30607 |
| 2015/0169593 A1* | 6/2015 | Bogdanova | G06F 17/3071 |
| | | | 707/738 |

* cited by examiner

AUTOMATED DETERMINATION OF DOCUMENT UTILITY FOR A DOCUMENT CORPUS

GOVERNMENT LICENSE RIGHTS

This invention was made with government support under contract 2013-12101100008 awarded by the U.S. Department of Defense. The government has certain rights in the invention.

BACKGROUND

Embodiments of the inventive subject matter generally relate to the field of computers, and, more particularly, to determining document utility for a document corpus.

Computerized database and the connectivity provided by the Internet has made an almost overwhelming amount of information available for search by users such as students, research scientists or anyone else with access to a computing device. Question and Answer (Q/A) systems have been developed to assist such searches, which may take an input question, analyze it, and return results indicative of the most probable answer to the input question. Q/A systems provide automated mechanisms for searching through large sets of documents, and analyze them with regard to an input question to determine an answer to the question. The quality of the answers provided by a Q/A system and the amount of time it takes to provide answers can be highly dependent on the content and the amount of available content.

SUMMARY

Systems, methods and computer program products of varying scope determine document utility to determine whether or not a document is to be added to a document corpus. A candidate document is received, for example, by a document filter. A determination is made based on the content of the candidate document, whether the candidate document is relevant to a document corpus. A determination is made based on the content of the candidate document, whether the candidate document is novel with respect to the document corpus. In response to determining that the candidate document is relevant to the document corpus and novel with respect to the document corpus, the candidate document is added to the document corpus to make at least a portion of the content of the candidate document available for a response to a search query.

BRIEF DESCRIPTION OF THE DRAWINGS

The aspects of the disclosure may be better understood by those skilled in the art by referencing the accompanying drawings.

DESCRIPTION OF EMBODIMENT(S)

The description that follows includes example systems, methods, techniques, instruction sequences and computer program products that embody techniques of the present inventive subject matter. However, it is understood that the described embodiments may be practiced without these specific details. For instance, although aspects of the disclosure are described in the context of a question/answer system, the systems and methods may be applied to other systems that maintain a corpus of documents. In other instances, well-known instruction instances, protocols, structures and techniques have not been shown in detail in order not to obfuscate the description.

In various aspects of the disclosure, a question and answer (Q/A) system can search a document corpus for answers to questions submitted via client devices. The Q/A system can receive documents to be added to the document corpus. In some aspects, the Q/A system can determine if a candidate document provides enough utility to justify adding the candidate document to the document corpus, based on the relevance of the candidate document and the novelty of the document with respect to the document corpus. The various aspects of the disclosure thus solve the technical problem of increased search times associated with adding documents that may not be relevant or may not add useful information through a technical solution that includes automatically determining whether the document provides enough utility to justify the potential increased search time.

Figure 1:
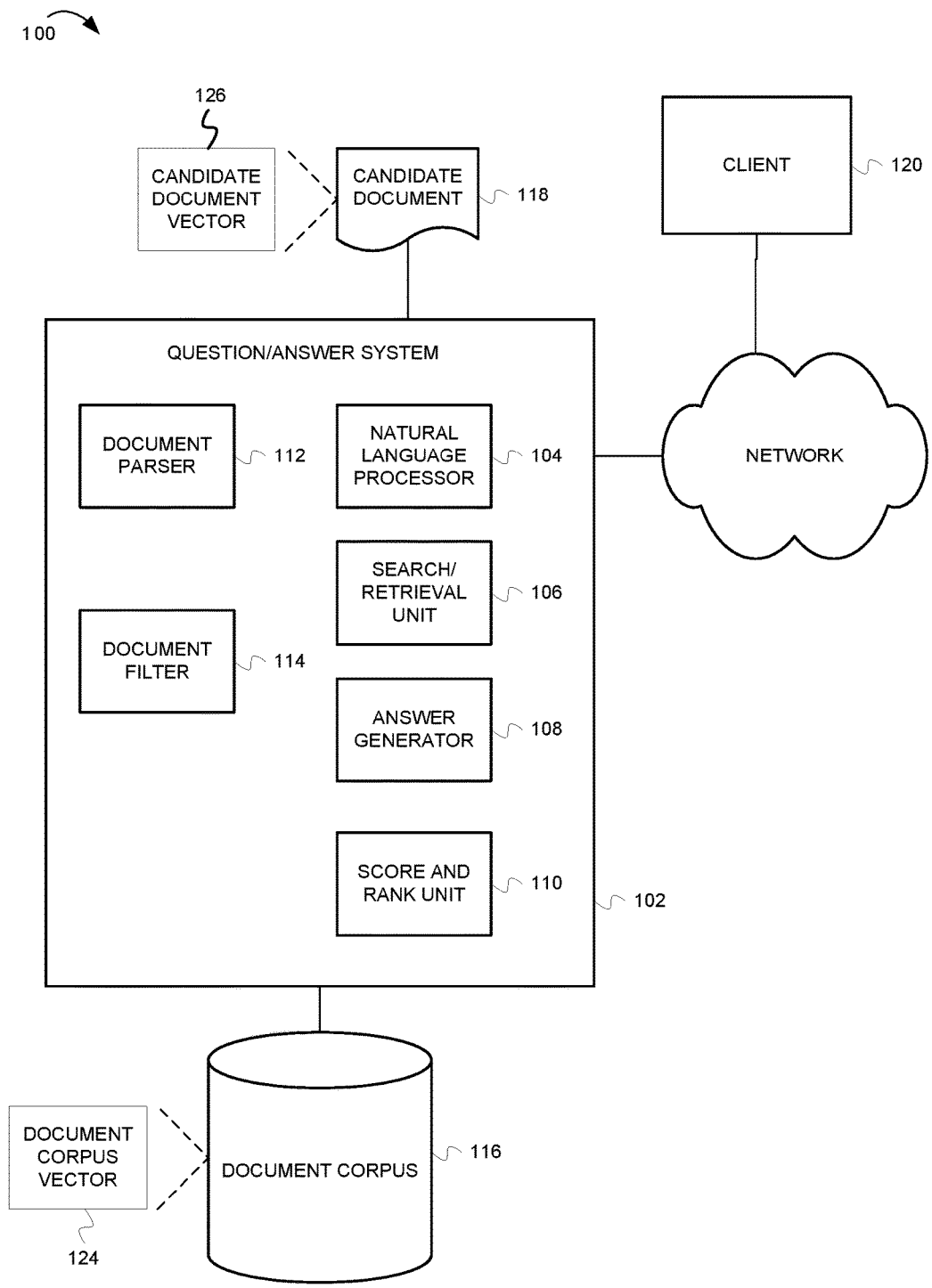
FIG. 1 is a block diagram of a system including a document filter that determines document utility.

FIG. 1 is a block diagram of a system 100 that includes components configured to determine the utility of a candidate document with respect to a document corpus. In some aspect, system 100 includes a question/answer (Q/A) system 102, a document corpus 116 and a client device 120. Q/A system 102 may be communicably coupled with a client device 120 and with document sources via a network 122. Network 122 may be any type of network or collection of networks, including local area networks, metropolitan area networks, personal area networks, intranets. In some aspects, network 122 may be the Internet.

Document corpus 116 comprises a collection of documents. As used herein, a document may be a file, database object, or other data container that includes text that may be used to answer questions posed to the Q/A system 102. The content may be primarily textual in nature, as in the case of electronic journal articles. While the primary content in the document may be textual in nature, a document may include other forms of content having associated text. For example, a document may have primarily graphical content, with metadata in text form that describes the graphical content. In some aspects, the document corpus may be focused on a particular domain (also referred to as a topic). For example, a document corpus that is focused on a health care domain may be dedicated to documents that contain documents relevant to health care. A document corpus that is focused on financial information will contain documents relevant to finance. While a document corpus may be dedicated to a particular domain, the aspects of the disclosure are not limited to any particular domain.

In some aspects, Q/A system 102 maintains a document corpus vector 124. The document corpus vector 124 is a vector that has a cell corresponding to each unique word appearing in the document corpus 116. The cell value is a count of the number of times the unique word appears in the document corpus.

Q/A system 102 can receive questions from client devices (e.g., client device 120) and process the questions to determine answers to the questions. In some aspects, questions submitted to the Q/A system 102 are processed as part of a pipeline that includes a natural language processor 104, a search retrieval unit 106, an answer generator 108, and a score and rank unit 110.

Natural language processor 104 receives an input question in a natural language format and parses the question to identify entities and concepts in the question. For example, a user may input the question "who was president when Pearl Harbor was bombed?" The natural language processor 104 analyzes the question to identified the entities and concepts in the question.

Search retrieval unit 106 uses the entities and concepts identified by natural language processor 104 to generate one or more queries. The queries are executed against the documents in the document corpus 116. The queries can return a results set of documents that match the query terms.

Answer generator 108 analyzes the documents in the results set and suggests text from the documents in the results set that may be used as potential answers to the question.

Score and rank unit 110 determines a score for the potential answers, and ranks the potential answers by the determined score. In some aspects, separate scores may be determined based on how well a potential answer matches the entities in the question, the concepts in the question, and the context of the question. The separate scores may be optionally weighted and combined to produce an overall score. The overall score can then be used to rank the potential answers. The top ranking answer or answers can then be returned in response to the user's question.

As will be appreciated from the above, the answers provided by the Q/A system 102 will depend on the content available in the document corpus 116. Documents may be added to document corpus 116 in order to update or improve the available content. In some aspects, a document parser 112 and document filter 114 process and analyze a candidate document 118 that has been identified for potential addition to the document corpus. Document parser 112 parses the document according to the format of the document (e.g., Portable Document Format (PDF), Hypertext Markup Language (HTML), word processing document (Microsoft® Word etc.)) to determine unique words and a count of the number of times a unique word appears in the candidate document. In some aspects, the document filter can create a candidate document vector 126 similar to document corpus vector 124 that contains cells having values that correspond to counts of the number of times words associated with the cell appear in the candidate document.

Document filter 114 analyzes candidate document 118 to determine if the candidate document 118 has sufficient utility to justify adding the document to the document corpus 116. In some aspects, document filter 114 determines if candidate document 118 is sufficiently relevant to the domain associated with the document corpus 116 and if the candidate document 118 is sufficiently novel with respect to documents in the document corpus 116. If the document filter 114 determines that the candidate document 118 has sufficient utility with respect to the document corpus 116, the candidate document 118 is added to the document corpus 116. If the document filter 114 determines that the document does not have sufficient utility, the candidate document 118 is not added to the document corpus 116. In some aspects, the document filter 114 uses the document corpus vector 124 and candidate document vector 126 as further described below to determine if a candidate document 118 has sufficient utility to justify adding the document to the document corpus 116.

In the description above, the natural language processor 104, search retrieval unit 106, answer generator 108, and score and rank unit 110 have been described as discrete entities. Similarly, the document parser 112 and document filter 114 have been described as discrete entities. It should be noted that the processing and functionality of these entities may be combined, and further that the processing and functionality may be distributed differently than described above. For example, the functionality provided by the document parser 112 may be incorporated into the document filter 114.

Further details on the operation of system 100 are provided below with respect to FIGS. 2 and 3.

Figure 2:
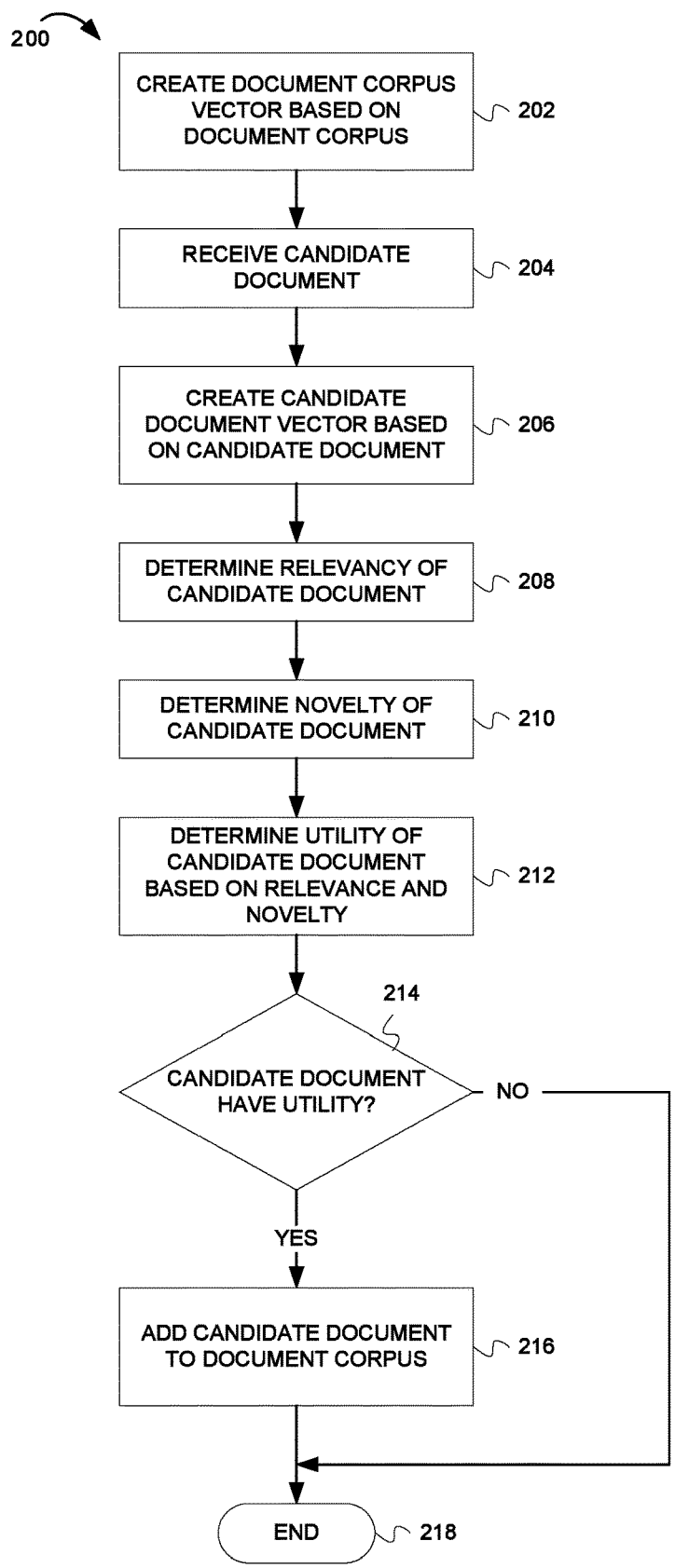
FIG. 2 is a flow chart illustrating a method for determining document utility.

FIG. 2 is a flow chart 200 illustrating a method for determining utility of a candidate document with respect to a document corpus.

At block 202, Q/A system 102 creates a document corpus vector 124 based on an initial or seed document corpus 116. As described above, the document corpus vector 124 includes a cell for each unique word in the document corpus 116. The value of a particular cell can be derived from the number of times a particular word occurs in the document corpus. In some aspects, the cell value can be a count of the number of times the word appears in the documents in the document corpus 116. The count can be weighted. For example, the count may be weighted according to a term frequency-inverse document frequency (tf-idf) statistic. The tf-idf statistic indicates how important a word is to a document in a document corpus. The tf-idf statistic for a word increases proportionally to the number of times a word appears in the corpus, and is offset according to the number of documents in the corpus that contain the word. In alternative aspects, the cell value can be a Boolean value indicating that the word occurs in the document corpus.

Further, an additional cell can be added to the document corpus vector. This additional cell will be referred to as an "out of vocabulary" (OOV) cell. Thus, in some aspects, the document corpus vector has n+1 cells, where n is the number of unique words in the document corpus. The OOV cell can be used to hold a value comprising a count of the number of words that appear in a document that are not currently in the words in the document corpus 116. For the document corpus 116, this value is zero.

Figure 3:
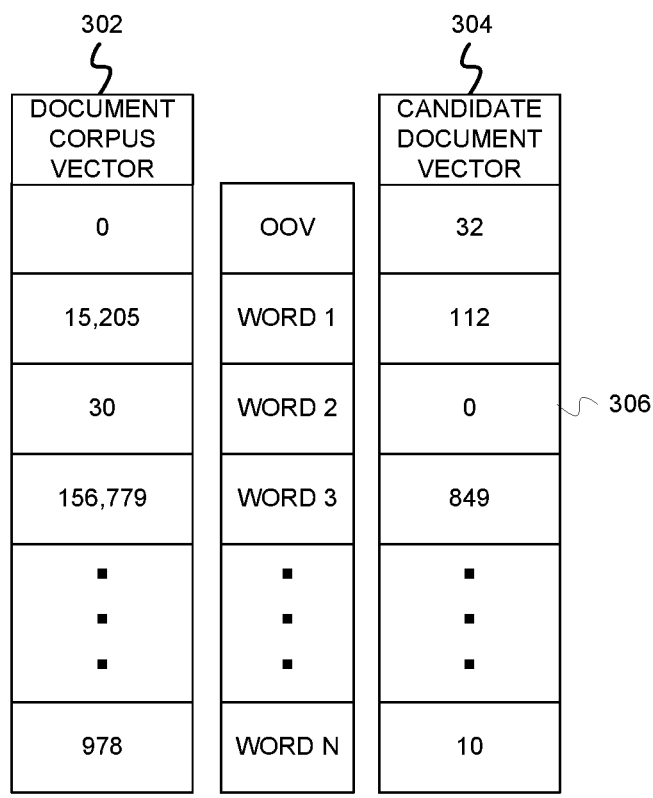
FIG. 3 is an example document vector.

FIG. 3 illustrates an example document corpus vector 302. In the example illustrated in FIG. 3, the word associated with the word 1 cell appears throughout documents in the document corpus 15,205 times. The word associated with the word 2 cell appears 30 times throughout the documents in the document corpus.

Returning to FIG. 2, at block 204, Q/A system 102 receives a candidate document 118. The candidate document 118 may be received in various ways. For example, the candidate document 118 may be part of a stream of documents received over network 122. The stream of documents may be from a database of documents. For example, a user may have subscribed to a database of health information. The documents in the database may be streamed to the Q/A system, and each document may be analyzed to determine utility of the document with respect to the document corpus 116. The document may also be received on a computer-readable storage medium.

At block 206, a document parser 112 parses the candidate document 118 and creates a candidate document vector based on the content of the candidate document 118. The candidate document vector has the same cells as the document corpus vector, and each cell in the candidate document vector 126 can be mapped to the same word as in the corresponding cell of the document corpus vector 124. The cell values in the candidate document vector 126 can be determined in the same way the cell values are determined for the document corpus. Thus in some aspects, the cell values comprise counts of the number of times the associated word appears in the candidate document 118. If a word appears in the candidate document 118, but is not found in the document corpus 116, then the count associated with the word is added to the OOV cell. FIG. 3 illustrates an example candidate document vector 304. In the example illustrated in FIG. 3, word 1 appears in the candidate document 118 a total of 112 times. Word 2 is in the document corpus 116, but does not appear in the candidate document 118, therefore the cell value in the example candidate document vector 304 is zero. The value of the OOV cell in the example candidate document vector is 32, which indicates there are 32 instances of words that appear in the candidate document 118, but are not currently in any documents in the document corpus 116. The count can be weighted using a tf-idf statistic. In alternative aspects, the cell value can be a Boolean value indicating whether or not the word occurs in the document.

In alternative aspects, the document corpus vector 124 and the candidate document vector 126 may be Boolean vectors. In these aspects, rather than a count of the times a word is in the document corpus or the candidate document, the cell values can be Boolean values that indicate whether or not the word is in the document corpus or candidate document. For example, a value of one (1) may be used to indicate the word appears at least once in the candidate document while a value of zero (0) may be used to indicate the word does not appear in the candidate document.

Returning to FIG. 2, at block 208, document filter 114 determines a relevancy associated with the candidate document 118. The relevancy of the candidate document 118 is an indication of whether the candidate document is similar to the documents in the document corpus 116. In some aspects, the relevancy of the candidate document 118 is represented as a relevancy score (also referred to as a similarity score). The relevancy score can be a cosine similarity between the candidate document vector and the document corpus vector. In some aspects, the relevancy score of a candidate document 118 with respect to the document corpus 116 can be determined according to the following formula:

$$RELEVANCE_C(D) = \frac{\sum_{i=0}^{n} C_i D_i}{\sqrt{\sum_{i=0}^{n} C_i^2} \sqrt{\sum_{i=0}^{n} D_i^2}} \quad (1)$$

where "C" represent the document corpus 116, "D" represents the candidate document 118, "n" is the number of cells in the vector, and "i" is an index to the word count in the vector. Because a word count in a cell cannot be less than zero, the relevance score will range in value from zero (completely irrelevant) to 1 (completely relevant).

The relevancy of a candidate document 118 may be determined in other ways. For example, the relevancy may be determined according to angular similarity between the document corpus vector and the candidate document vector. Further, a Tanimoto coefficient or Ochiai coefficient may be calculated with respect to the document corpus vector 124 and the candidate document vector 126 and used to determine relevance of the candidate document 118 with respect to the document corpus 116.

At block 210, the document filter 114 determines whether the candidate document 118 is novel with respect to the document corpus 116. In some aspects, a redundancy score is determined. The redundancy score can be determined by calculating the cosine similarity of the candidate document 118 with individual documents in the document corpus 116. If the document corpus 116 is sufficiently small, then this calculation can be performed for every document in the document corpus 116. However, for larger corpora, a subset of documents from the document corpus 116 may be selected. In some aspects, the subset may be randomly selected documents from the document corpus 116. The redundancy score can be determined as follows:

$$REDUNDANCY_C(D) = \max_{0 \le i \le n} (RELEVANCE_{E_i}(D)) \quad (2)$$

where "D" represents the candidate document 118, "C" represent the document corpus 116, and "E" represents the selected subset. Thus, the redundancy score determines if the candidate document 118 is similar to any of the individual documents in the selected subset. The relevance score associated with the document in the selected subset that is most similar to the candidate document 118 can be used as the redundancy score for the document corpus 116. The size of the subset to use for the determining the redundancy score can be based on a desired accuracy and resource usage characteristic. For example, if high accuracy is desired, a large subset may be selected, at the expense of requiring more time. Alternatively, if rapid determination of redundancy is desired, a smaller sample set may be selected, at the potential expense of accuracy of the determination.

After determining the redundancy score, a novelty score can be determined as follows:

$$NOVELTY_C(D) = 1 - REDUNDANCY_C(D) \quad (3)$$

At block 212, the document filter determines a utility of the candidate document 118 with respect to the document corpus 116. In some aspects, the document filter determines a utility score using the relevance score and the novelty score. The utility score can be determined as follows:

$$UTILITY_C(D) = RELEVANCE_C(D) + NOVELTY_C(D) \quad (4)$$

In some aspects, the individual relevance and novelty components can be weighted.

At block 214, the document filter 114 determines if the candidate document 118 has utility with respect to the document corpus 116. In some aspects, if the utility score exceeds a predetermined or configurable threshold, then the candidate document 118 is determined to have utility with respect to the document corpus 116. In this case, the method proceeds to block 216, and the candidate document 118 is added to the document corpus 116. A new document corpus vector 124 may be calculated based on the addition of the candidate document 118 to the document corpus 116. Alternatively, if the candidate document 118 is determined not to have utility with respect to the document corpus, then the method ends, and the candidate document 118 is not added to the document corpus 116.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
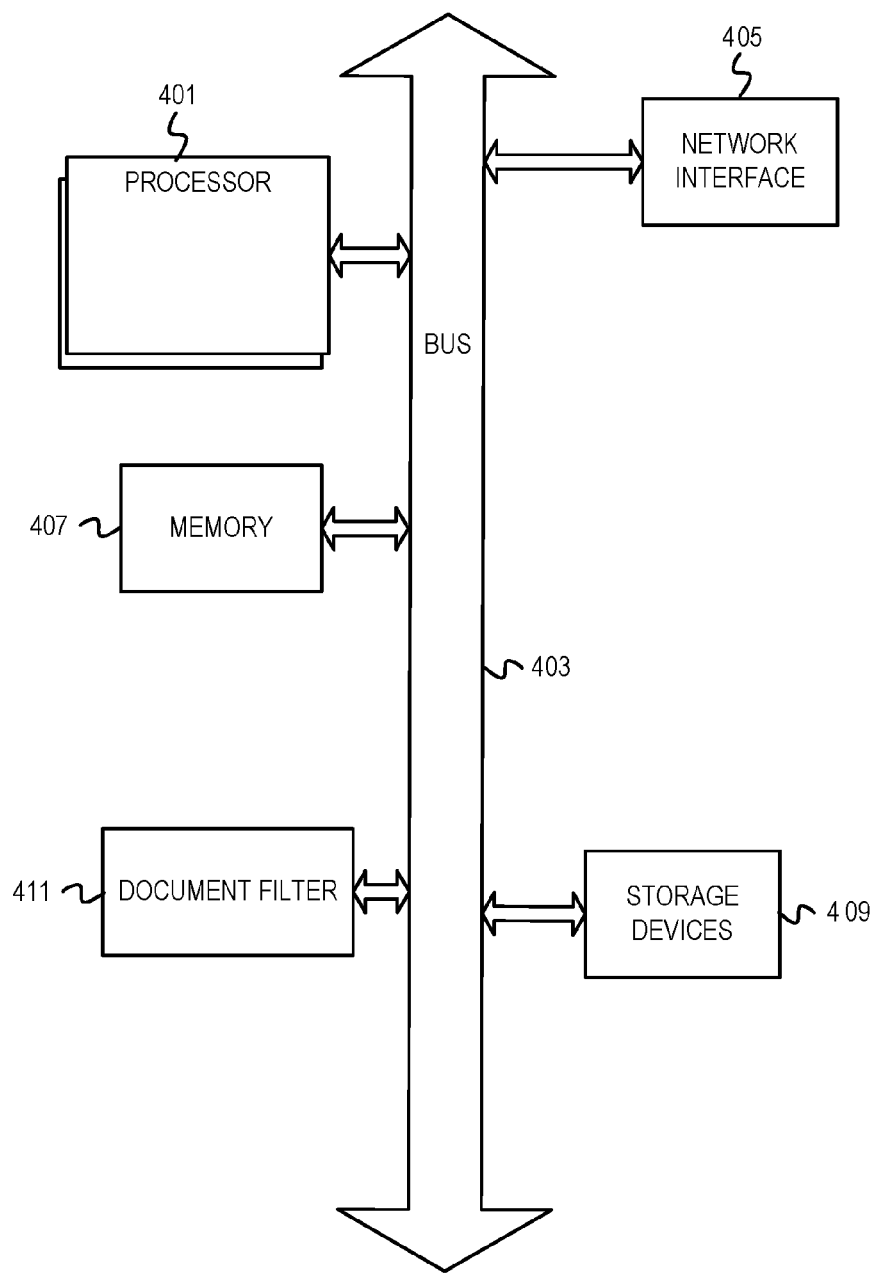
FIG. 4 depicts an example computer system.

FIG. 4 depicts an example computer system. A computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport®, InfiniBand®, NuBus, etc.), a network interface 405 (e.g., an ATM interface, an Ethernet interface, a Frame Relay interface, SONET interface, wireless interface, etc.), and a storage device(s) 409

(e.g., optical storage, magnetic storage, etc.). The system memory 407 embodies functionality to implement embodiments described above. The system memory 407 may include one or more functionalities that facilitate determining whether candidate documents are useful additions to a document corpus. For example, the system memory 407 may include a document filter 411. Any one of these functionalities may be partially (or entirely) implemented in hardware and/or on the processor unit 401. For example, the functionality may be implemented with an application specific integrated circuit, in logic implemented in the processor unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 409, and the network interface 405 are coupled to the bus 403. Although illustrated as being coupled to the bus 403, the memory 407 may be coupled to the processor unit 401.

While the embodiments are described with reference to various implementations and exploitations, it will be understood that these embodiments are illustrative and that the scope of the inventive subject matter is not limited to them. In general, techniques for determining document utility with respect to a document corpus as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer implemented method for determining whether to add a document to an electronic document corpus maintained in at least one electronic data store, the method comprising:
   creating, based at least in part on the content of the document corpus, a corpus vector including corpus cells, each corpus cell indicating a word in the document corpus and corpus word count indicating a number of instances of the word in the document corpus; and
   receiving, via one or more processors, an electronic candidate document;
   creating, based at least in part on the content of the candidate document, a document vector including document cells, each document cell indicating a word in the candidate document and document word count indicating a number of instances of the word in the candidate document;
   determining, by at least one of the processors, a relevance value indicating relevance of the candidate document to the document corpus, wherein determining the relevance value includes
   for each corpus cell in the document corpus vector, determining a product by multiplying the corpus word count by a document word count of a corresponding document cell in the document vector;
   determining a numerator by summing the products;
   determining a first sum by summing a square of the corpus word count in each corpus cell in the corpus vector,
   determining a second sum by summing a square of the document word count in each document cell in the document vector,
   determining a first square root of first sum and a second square root of the second sum;
   determining a denominator by multiplying the first square root by the second square root;
   dividing the numerator by the denominator;
   determining, by the one or more processors, that the candidate document is novel with respect to the document corpus based on the relevance value; and
   in response to determining that the candidate document is relevant to the document corpus and novel with respect to the document corpus, adding the candidate document to the document corpus to make at least a portion of the content of the candidate document available for a response to a search query.

2. The method of claim 1, wherein determining, based at least in part on the content of the candidate document, that the candidate document is novel with respect to the document corpus includes determining that the candidate document is novel with respect to one or more documents in the document corpus.

3. The method of claim 2, further comprising randomly selecting the one or more documents from the document corpus.

4. The method of claim 2, wherein creating the candidate document vector includes:
   determining first vector cells in the candidate document vector associated with unique words in the candidate document, the first vector cells determined, based at least in part, on counts of the unique words in the candidate document; and
   adding a second vector cell to the candidate document vector, the second vector cell comprising a count of unique words not found in the document corpus.

5. The method of claim 4, wherein the first vector cells comprise the counts of the unique words.

6. The method of claim 5, further comprising weighting the counts in the first vector cells according to a term frequency-inverse document frequency statistic.

7. A computer program product comprising a non-transitory computer readable storage medium having program instructions embodied therewith, the program instructions executable by a computer to cause the computer to determine document utility, the program instructions comprising:
   program instructions to create, based at least in part on the content of the document corpus, a corpus vector including corpus cells, each corpus cell indicating a word in the document corpus and corpus word count indicating a number of instances of the word in the document corpus; and
   program instructions to receive, via one or more processors, an electronic candidate document;
   program instructions to create, based at least in part on the content of the candidate document, a document vector including document cells, each document cell indicating a word in the candidate document and document word count indicating a number of instances of the word in the candidate document;

program instructions to determine, by at least one of the processors, a relevance value indicating relevance of the candidate document to a the document corpus, wherein the program instructions to determine the relevance value includes program instructions to for each corpus cell in the document corpus vector, determining a product by multiply the corpus word count by a document word count of a corresponding candidate document cell;

determine a numerator by summing the products;

determine a first sum by summing a square of the corpus word count in each corpus cell in the corpus vector, determine a second sum by summing a square of the document word count in each document cell in the document vector, determine a first square root of first sum and a second square root of the second sum;

determine a denominator by multiplying the first square root by the second square root;

divide the numerator by the denominator;

program instructions to determine, by the one or more processors, that the candidate document is novel with respect to the document corpus based on the relevance value; and program code to in response to the determination that the candidate document is relevant to the document corpus and novel with respect to the document corpus, add the candidate document to the document corpus to make at least a portion of the content of the candidate document available for a response to a search query.

8. The computer program product of claim 7, the program instructions further comprising program instructions to randomly select the one or more documents from the document corpus.

9. The computer program product of claim 7, wherein the program instructions to create the candidate document vector include program instructions to:

determine first vector cells in the candidate document vector associated with unique words in the candidate document, the first vector cells determined, based at least in part, on counts of the unique words in the candidate document; and add a second vector cell to the candidate document vector, the second vector cell comprising a count of unique words not found in the document corpus.

10. The computer program product of claim 9, wherein the first vector cells comprise the counts of the unique words.

11. An apparatus comprising:

one or more processors;

a computer program product comprising a computer readable storage medium having program instructions embodied therewith, the program instructions executable by the one or more processors to cause the computer to determine document utility, the program instructions comprising:

program instructions to create, based at least in part on the content of the document corpus, a corpus vector including corpus cells, each corpus cell indicating a word in the document corpus and corpus word count indicating a number of instances of the word in the document corpus; and program instructions to receive, via one or more processors, an electronic candidate document;

program instructions to create, based at least in part on the content of the candidate document, a document vector including document cells, each document cell indicating a word in the candidate document and document word count indicating a number of instances of the word in the candidate document;

program instructions to determine, by at least one of the processors, a relevance value indicating relevance of the candidate document to a the document corpus, wherein the program instructions to determine the relevance value includes program instructions to for each corpus cell in the document corpus vector, determining a product by multiply the corpus word count by a document word count of a corresponding document cell;

determine a numerator by summing the products;

determine a first sum by summing a square of the corpus word count in each corpus cell in the corpus vector, determine a second sum by summing a square of the document word count in each document cell in the document vector, determine a first square root of first sum and a second square root of the second sum;

determine a denominator by multiplying the first square root by the second square root;

divide the numerator by the denominator;

program instructions to determine, by the one or more processors, that the candidate document is novel with respect to the document corpus based on the relevance value; and program code to in response to the determination that the candidate document is relevant to the document corpus and novel with respect to the document corpus, add the candidate document to the document corpus to make at least a portion of the content of the candidate document available for a response to a search query.

12. The apparatus of claim 11, the program instructions further comprising program instructions to randomly select the one or more documents from the document corpus.

13. The apparatus of claim 11, wherein the program instructions to create the candidate document vector include program instructions to:

determine first vector cells in the candidate document vector associated with unique words in the candidate document, the first vector cells determined, based at least in part, on counts of the unique words in the candidate document; and add a second vector cell to the candidate document vector, the second vector cell comprising a count of unique words not found in the document corpus.

14. The apparatus of claim 13, wherein the first vector cells comprise the counts of the unique words.

* * * * *